United States Patent
Hori et al.

(10) Patent No.: US 8,905,244 B2
(45) Date of Patent: Dec. 9, 2014

(54) OIL FILTER AND VALVE DEVICE

(75) Inventors: Shuuji Hori, Oyama (JP); Mitsumasa Akashi, Oyama (JP); Masayuki Tajima, Oyama (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/695,524

(22) PCT Filed: Jul. 21, 2011

(86) PCT No.: PCT/JP2011/066572
§ 371 (c)(1),
(2), (4) Date: Oct. 31, 2012

(87) PCT Pub. No.: WO2012/029431
PCT Pub. Date: Mar. 8, 2012

(65) Prior Publication Data
US 2013/0153488 A1    Jun. 20, 2013

(30) Foreign Application Priority Data
Sep. 3, 2010    (JP) ................. 2010-198316

(51) Int. Cl.
| | | |
|---|---|---|
| B01D 35/02 | (2006.01) | |
| B01D 35/28 | (2006.01) | |
| B01D 29/03 | (2006.01) | |
| B01D 39/10 | (2006.01) | |
| B01D 29/15 | (2006.01) | |
| F16K 51/00 | (2006.01) | |
| B01D 29/01 | (2006.01) | |

(52) U.S. Cl.
CPC ............ *B01D 29/15* (2013.01); *B01D 35/02* (2013.01); *B01D 39/10* (2013.01); *F16K 51/00* (2013.01); *B01D 29/012* (2013.01); *B01D 29/03* (2013.01); *B01D 29/01* (2013.01)
USPC .......... 210/498; 210/432; 210/435; 210/445; 210/456; 210/483

(58) Field of Classification Search
None
See application file for complete search history.

(56) References Cited

U.S. PATENT DOCUMENTS

| 4,302,333 | A * | 11/1981 | Cosack et al. | ................ 210/456 |
| 7,201,846 | B2 * | 4/2007 | Cho et al. | ................ 210/321.84 |

FOREIGN PATENT DOCUMENTS

| CN | 1205649 A | 1/1999 |
| EP | 0873774 A1 | 10/1998 |
| JP | 53-146367 A | 12/1978 |
| JP | 57-111320 U | 7/1982 |
| JP | 62-151914 U | 9/1987 |

(Continued)

OTHER PUBLICATIONS

International Search Report dated Oct. 18, 2011, issued for PCT/JP2011/066572.

(Continued)

*Primary Examiner* — Benjamin Kurtz
(74) *Attorney, Agent, or Firm* — Edwards Wildman Palmer LLP

(57) ABSTRACT

An oil filter interposed in an oil passage and configured to perform filtering of oil by causing the oil to pass through a passage hole of a filter body formed by etching, wherein an oil passing section is etched to a half of plate thickness of the filter body on one surface of the filter body, and a plurality of the passage holes are formed by etching in a region where the oil passing section is formed on the other surface of the filter body.

7 Claims, 6 Drawing Sheets

(56) References Cited

FOREIGN PATENT DOCUMENTS

| | | |
|---|---|---|
| JP | 2000-167318 A | 6/2000 |
| JP | 2004-150444 A | 5/2004 |
| JP | 2006-102720 A | 4/2006 |
| JP | 3949100 B2 | 7/2007 |
| KR | 10-2005-0065762 | 6/2005 |
| KR | 2007-0066734 A | 6/2007 |

OTHER PUBLICATIONS

Office Action dated Jun. 26, 2012, issued for the corresponding Japanese patent application No. 2012-517979 and English translation thereof.

\* cited by examiner

OIL FILTER AND VALVE DEVICE

FIELD

The present invention relates to an oil filter and a valve device.

BACKGROUND

In a valve device such as a pressure reducing valve applied to an oil hydraulic circuit, an oil filter is interposed in an oil passage for supplying oil to a spool. As the oil filter, an oil filter in which a wire gauge is used is present. However, recently, an oil filter in which passage holes are formed in a metal thin plate is also provided. With the oil filter of this type, it is unlikely that fluctuation in the passage holes due to loosening of the wire gauge is caused. It is possible to easily secure a certain level of quality (see, for example, Patent Literature 1).

CITATION LIST

Patent Literature

Patent Literature 1: Micro film disclosed in Japanese Utility Model Application No. S61-39036

SUMMARY

Technical Problem

The oil filter of this type is generally formed by etching. When the oil filter is formed by etching, the shape and the positions of the passage holes can be arbitrarily set according to the shape of masking. Formation work can be simplified. However, in the oil filter, the inner diameter of the passage holes is extremely small. Therefore, there is a substantial limitation on plate thickness when the oil filter is formed by etching. Specifically, when the plate thickness is large, time for etching is long. When the plate thickness is large, because the shape of the passage holes formed by etching is conical and an area occupied by the passage holes is large, a distance among the passage holes has to be set large. It is difficult to increase the number of the passage holes. Therefore, sufficient rigidity cannot be secured for the oil filter. For example, when a jet stream occurs in the oil hydraulic circuit, it is likely that the oil filter is easily damaged. When the oil filter is damaged, unfiltered oil flows into a valve of a spool or the like. It is difficult to guarantee the function of the valve device.

In view of the circumstances, it is an object of the present invention to provide an oil filter and a valve device that can secure sufficient rigidity and simplify formation work.

Solution to Problem

To achieve the object mentioned above, according to the present invention, an oil filter interposed in an oil passage and configured to perform filtering of oil by causing the oil to pass through a passage hole of a filter body formed by etching, wherein an oil passing section is etched to a half of plate thickness of the filter body on one surface of the filter body, and a plurality of the passage holes are formed by etching in a region where the oil passing section is formed on the other surface of the filter body.

In the oil filter, the passage holes are distributed such that a passage ratio of the oil in a portion located in a center of the filter body is smaller than a passage ratio of the oil in a portion located on a circumferential edge of the filter body.

In the oil filter, a plurality of the oil passing sections having a same size are uniformly arranged in the filter body, and the number of the passage holes per unit area in the oil passing section arranged on a center side of the filter body is set smaller than the number of the passage holes per unit area in the oil passing section arranged on an outer circumferential side of the filter body.

In the oil filter, a plurality of the oil passing sections having a same number of the passage holes per unit area are arranged to be sparse in the center of the filter body compared with the circumferential edge of the filter body.

In the oil filter, a shield section configured to prevent the passage of the oil is formed in the center of the filter body, and the passage holes are provided around the shield section.

In the oil filter, a shield plate is arranged in the center of the filter body.

In a valve device according to the present invention, an oil filter is interposed at least in an oil passage leading to a spool of a valve body, the oil filter interposed in an oil passage and configured to perform filtering of oil by causing the oil to pass through a passage hole of a filter body formed by etching, wherein an oil passing section is etched to a half of plate thickness of the filter body on one surface of the filter body, and a plurality of the passage holes are formed by etching in a region where the oil passing section is formed on the other surface of the filter body.

Advantageous Effects of Invention

According to the present invention, passage holes are formed in a state in which an oil passing section is formed. Therefore, as a filter body, a filter body having relatively large plate thickness can be applied. Consequently, it is possible to secure large rigidity of the filter body.

DESCRIPTION OF EMBODIMENTS

Preferred embodiments of an oil filter and a valve device according to the present invention are explained in detail below with reference to the accompanying drawings.

First Embodiment

Figure 1A:
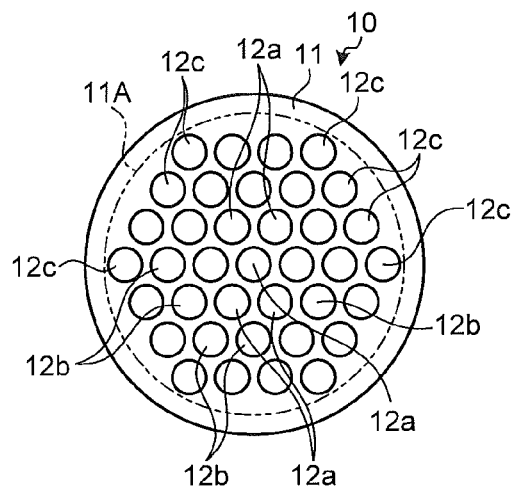
FIG. 1A is a diagram of an oil filter according to a first embodiment of the present invention.
Figure 1B:
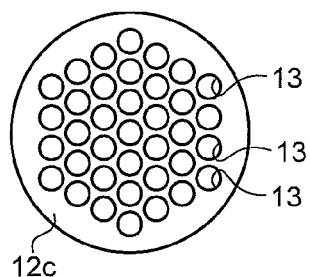
FIG. 1B is an enlarged diagram of an oil passing section provided on the outer circumferential side of the circumferential edge of a filter body in the oil filter shown in FIG. 1A.
Figure 1C:
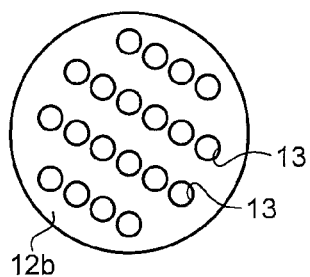
FIG. 1C is an enlarged diagram of an oil passing section provided on the inner circumferential side of the circumferential edge of the filter body in the oil filter shown in FIG. 1A.
Figure 1D:
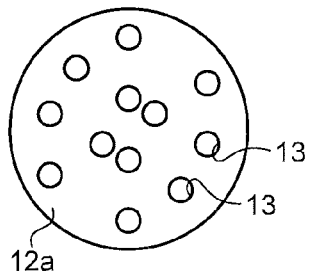
FIG. 1D is an enlarged diagram of an oil passing section provided in the center of the filter body in the oil filter shown in FIG. 1A.
Figure 2:
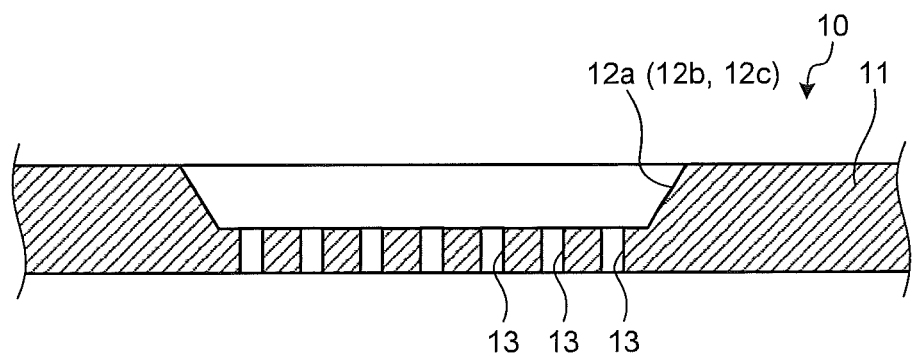
FIG. 2 is an enlarged sectional view of a main part of the oil filter shown in FIG. 1A.
Figure 3:
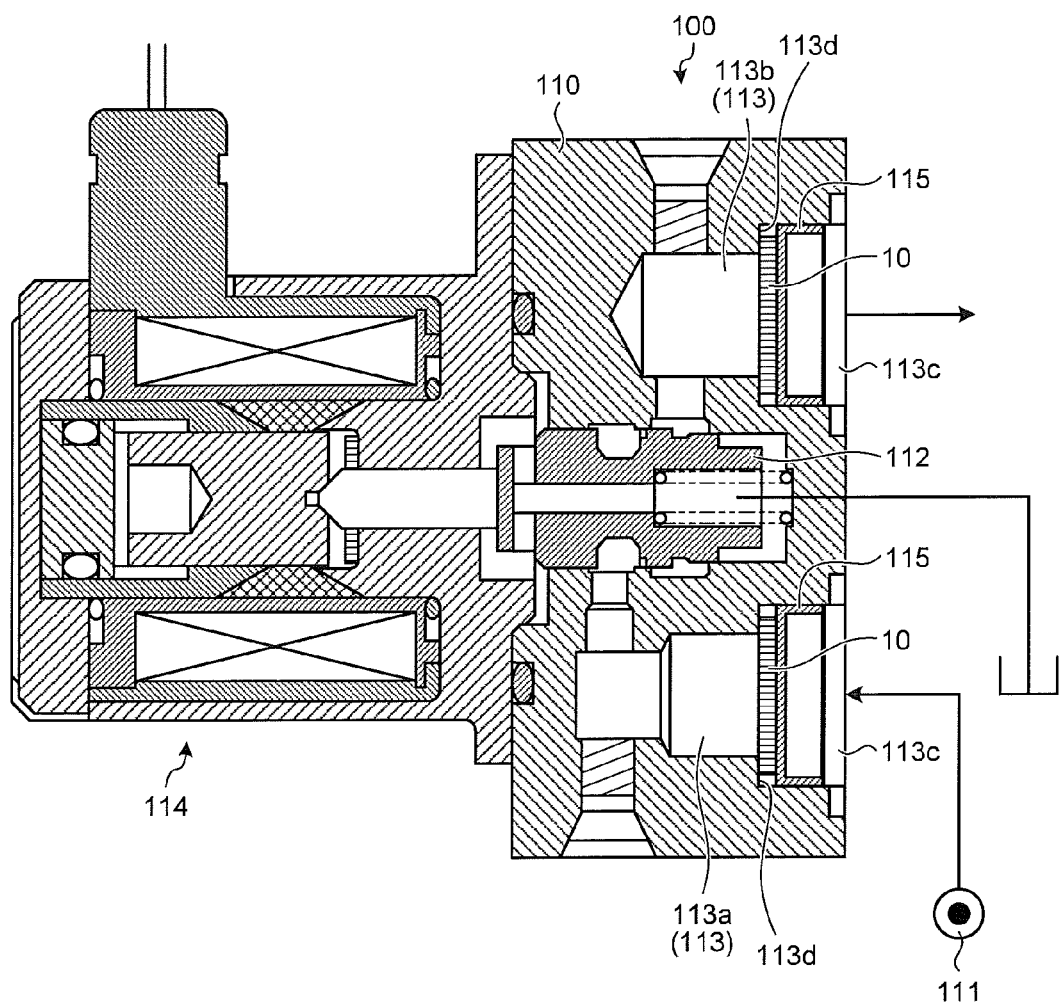
FIG. 3 is a sectional view of a valve device to which the oil filter shown in FIG. 1A is applied.

FIGS. 1A to 2 are diagrams of an oil filter according to a first embodiment of the present invention. As shown in FIG. 3, oil filters 10 illustrated herein are interposed in a supply oil passage 113a leading from an oil supply source 111 to a spool 112 and a discharge oil passage 113b for discharging oil passed through the spool 112 in a valve body 110 of a valve device 100 to filter the oil passing through the respective oil passages 113. The valve device 100 moves the spool 112 in the axis direction using an electromagnetic solenoid 114 as a driving source and performs passage control for the oil from the supply oil passage 113a to the discharge oil passage 113b. In the supply oil passage 113a and the discharge oil passage 113b, filter housing sections 113c are formed in regions where the oil filters 10 are set. The filter housing sections 113c have a transverse section formed in a circular shape having a diameter larger than the diameter of the oil passages 113. Steps 113d are formed between the filter housing sections 113c and the oil passages 113.

In the oil filter 10 attached to the filter housing section 113c, as shown in FIGS. 1A to 3, a filter body 11 is formed in a disk shape having a diameter slightly smaller than the diameter of the filter housing section 113c of the valve body 110. A spacer ring 115 is fit in the filter housing section 113c, whereby the filter body 11 is fixed and set in the filter housing section 113c in a state in which the circular circumferential edge of the filter body 11 is held between the step 113d and the spacer ring 115.

In the filter body 11, a plurality of oil passing sections 12a, 12b, and 12c are provided. The oil passing sections 12a, 12b, and 12c are recesses formed on one surface of the filter body 11. The oil passing sections 12a, 12b, and 12c, openings of which are formed in circular shapes having the same size, are disposed in a region (hereinafter referred to as "effective region 11A") opposed to openings of the supply oil passage 113a and the discharge oil passage 113b in the filter body 11. The oil passing sections 12a, 12b, and 12c are uniformly arranged in the effective region 11A of the filter body 11. The number per unit area of the oil passing sections 12a, 12b, and 12c is substantially the same in any place of the effective region 11A.

A plurality of passage holes 13 are formed in each of the oil passing sections 12a, 12b, and 12c. The passage holes 13 are through-holes having the same inner diameter. The inner diameter of the passage holes 13 is set to a dimension necessary for exhibiting a desired filter function. As it is evident from FIGS. 1B to 1D, the passage holes 13 formed in the oil passing sections 12a, 12b, and 12c are formed such that the number per unit area of the oil passing sections 12b and 12c arranged on the circumferential edge of the filter body 11 is large compared with the oil passing sections 12a arranged in the center of the filter body 11. On the circumferential edge of the filter body 11, the passage holes 13 of the oil passing sections 12c located further on the outer circumferential side are set to be larger in the number per unit area than the oil passing sections 12b located on the inner circumferential side.

As shown in FIG. 2, all of the oil passing sections 12a, 12b, and 12c and the passage holes 13 are formed by applying etching to the filter body 11. More specifically, a filter body made of metal is applied as the filter body 11. First, in a state in which one surface of the filter body 11 is masked, the oil passing sections 12a, 12b, and 12c are formed to a half of the plate thickness of the filter body 11 by applying etching to the other surface (so-called half etching). Thereafter, in a state in which the surface on which the oil passing sections 12a, 12b, and 12c are formed is masked, the passage holes 13 are formed by etching from the surface on the opposite side of the filter body 11.

In the oil filter 10 configured as explained above, the passage holes 13 are formed in a state in which the oil passing sections 12a, 12b, and 12c are formed. Therefore, a filter body having relatively large plate thickness can be applied as the filter body 11. The passage holes 13 of the oil filter 10 have an extremely small inner diameter. Therefore, when the passage holes 13 are formed by etching, there is a substantial limitation on the plate thickness of the filter body 11. However, if the oil passing sections 12a, 12b, and 12c are formed as explained above, the plate thickness of a portion where the passage holes 13 are formed can be set small irrespective of the plate thickness of the filter body 11. Consequently, it is possible to secure large rigidity of the filter body 11. Above all, in the center of the filter body 11, because the number of the passage holes 13 is small compared with the circumferential edge of the filter body 11, the rigidity is large compared with the circumferential edge. The flow velocity distribution of the oil in the oil passage 113 is large in the center compared with the circumferential edge. Therefore, the oil filter 10 configured to have the large rigidity in the center is extremely advantageous in terms of durability.

Further, in the oil filter 10, the aperture ratio of the passage holes 13 in the center of the filter body 11, i.e., the passage ratio of the oil is small compared with the circumferential edge. Therefore, when the oil filter 10 is attached to the oil passage 113, passage resistance is large in the center where the flow velocity of the oil is large. On the other hand, passage resistance on the circumferential edge is small. As a result, the flow of the oil is dispersed to substantially the entire area on the transverse section of the oil passage 113. Therefore, even when a jet stream occurs in the oil passage 113, the jet stream does not directly collide with the center of the filter body 11. A load due to the jet stream is also dispersed to the entire filter body 11. As a result, it is possible to prevent damage to the filter body 11 due to the jet stream and improve reliability and durability of the valve device 100 to which the oil filter 10 is applied.

In the oil filter 10, a large difference does not occur in a caused pressure loss and pressure resistance irrespective of whether the oil passing sections 12a, 12b, and 12c are faced to the upstream side or the downstream side. Therefore, when the oil filter 10 is inserted, it is unnecessary to particularly pay attention to the direction of the oil filter 10.

In the valve device 100 according to the first embodiment explained above, the oil filters 10 are interposed in both of the supply oil passage 113a and the discharge oil passage 113b. However, the oil filter 10 can be interposed only in one of the supply oil passage 113a and the discharge oil passage 113b, more preferably, in the supply oil passage 113a.

Second Embodiment

Figure 4A:
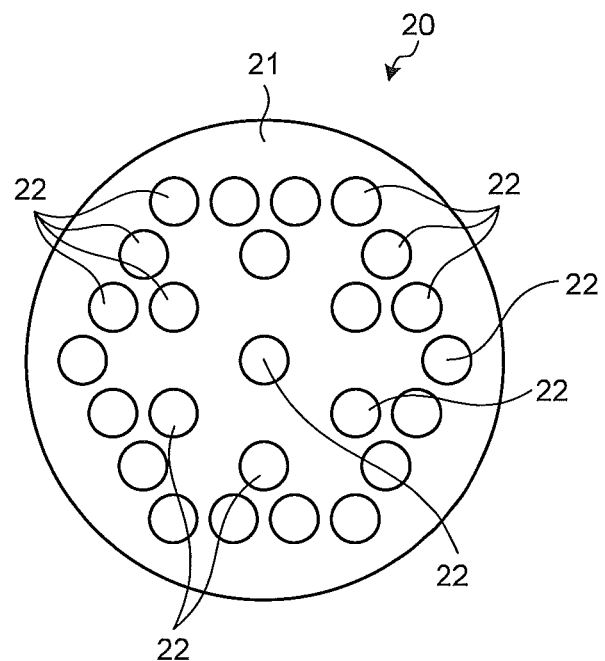
FIG. 4A is a diagram of an oil filter according to a second embodiment of the present invention.
Figure 4B:
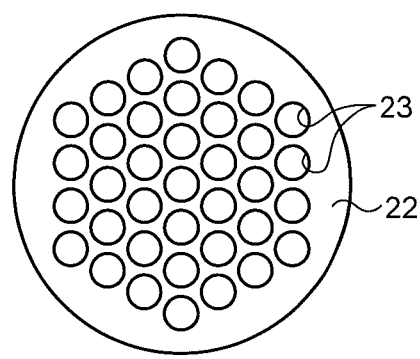
FIG. 4B is an enlarged diagram of oil passing sections provided in the center of a filter body in the oil filter shown in FIG. 4A, on the inner circumferential side of the circumferential edge of the filter body, and on the outer circumferential side of the circumferential edge of the filter body.

In the first embodiment explained above, the passage ratio of the oil is changed by changing the number of the passage holes 13 per unit area in the center and on the circumferential edge of the oil passing sections 12a, 12b, and 12c uniformly arranged in the effective region 11A of the filter body 11. On the other hand, in a second embodiment shown in FIGS. 4A and 4B, the passage ratio of oil is changed by changing the arrangement of oil passing sections in a filter body is changed in the center and on the circumferential edge of the filter body.

Specifically, in an oil filter 20 according to the second embodiment, oil passing sections 22 are arranged to be denser on the circumferential edge than in the center of a filter body 21. The number per unit area of passage holes 23 formed in the oil passing sections 22 is the same in the center and on the circumferential edge. When the oil filter 20 is formed, as in the first embodiment, etching only has to be applied to the filter body 21 made of metal to form the oil passing sections 22 and thereafter form the passage holes 23.

In the oil filter 20 configured as explained above, as in the oil filter 10, the passage holes 23 are formed in a state in which the oil passing sections 22 are formed. Therefore, a filter body having relatively large plate thickness can be applied as the filter body 21. Consequently, it is possible to secure large rigidity of the filter body 21. Above all, in the center of the filter body 21, because the number of the passage holes 23 is small compared with the circumferential edge of the filter body 21, the rigidity is large compared with the circumferential edge. The flow velocity distribution of the oil in the oil passage 113 is large in the center compared with the circumferential edge. Therefore, the oil filter 20 configured to have the large rigidity in the center is extremely advantageous in terms of durability.

Further, in the oil filter 20, the passage ratio of the oil in the center of the filter body 21 is small compared with the circumferential edge. Therefore, when the oil filter 20 is inserted into the oil passage 113 (FIG. 3), passage resistance is large in the center where the flow velocity distribution of the oil is large. On the other hand, passage resistance on the circumferential edge is small. As a result, the flow of the oil is dispersed to substantially the entire area on the transverse section of the oil passage 113 (FIG. 3). Therefore, even when a jet stream occurs in the oil passage 113 (FIG. 3), the jet stream does not directly collide with the center of the filter body 21. A load due to the jet stream is also dispersed to the entire filter body 21. As a result, it is possible to prevent damage to the filter body 21 due to the jet stream and improve reliability and durability of the valve device 100.

In the second embodiment, the number of the passage holes 23 per unit area is set the same in the center and on the circumferential edge of the oil passing section 22. However, the present invention is not limited to this. The number of the passage holes 23 per unit area can be set large on the circumferential edge compared with the center.

Third Embodiment

Figure 5A:
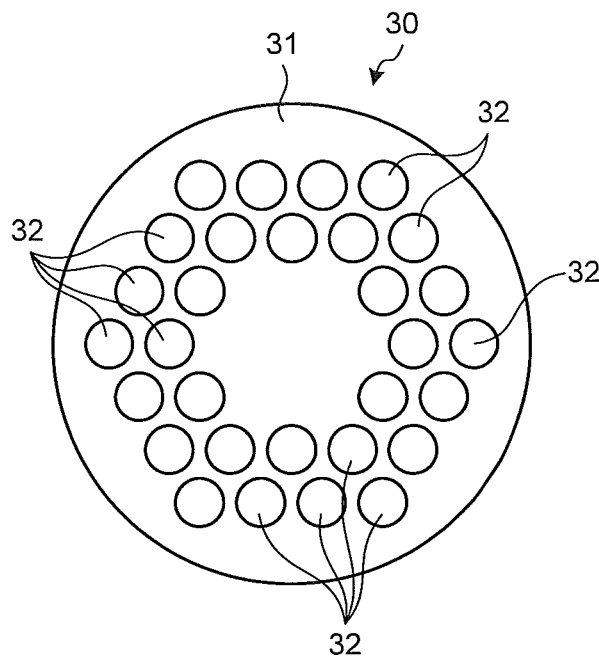
FIG. 5A is a diagram of an oil filter according to a third embodiment of the present invention.
Figure 5B:
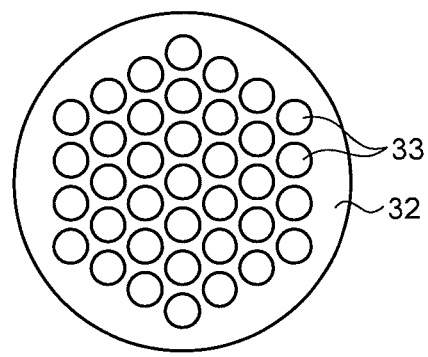
FIG. 5B is an enlarged diagram of an oil passing section provided on the outer circumferential side of the circumferential edge of a filter body in the oil filter shown in FIG. 5A and on the inner circumferential side of the circumferential edge of the filter body.

In the first embodiment explained above, the passage ratio of the oil is changed by changing the number of the passage holes 23 per unit area in the center and on the circumferential edge of the oil passing sections 22 uniformly arranged in the effective region 11A of the filter body 21. On the other hand, in an oil filter 30 according to a third embodiment shown in FIGS. 5A and 5B, oil passing sections 32 are formed only on the circumferential edge of a filter body 31 and are not provided at all in the center of the filter body 31. The number of passage holes 33 per unit area is set the same among the oil passing sections 32 arranged on the circumferential edge. A method of forming the oil filter 30 is the same as those in the first embodiment and the second embodiment.

In the oil filter 30 configured as explained above, as in the oil filters 10 and 20, the passage holes 33 are formed in a state in which the oil passing sections 32 are formed. Therefore, a filter body having relatively large plate thickness can be applied as the filter body 31. Consequently, it is possible to secure large rigidity of the filter body 31. Above all, in the center of the filter body 31, because the oil passing sections 32 and the passage holes 33 are not present at all, the rigidity is large compared with the circumferential edge. The flow velocity distribution of the oil in the oil passage 113 (FIG. 3) is large in the center compared with the circumferential edge. Therefore, the oil filter 30 configured to have the large rigidity in the center is extremely advantageous in terms of durability.

Further, in the oil filter 30, the passage ratio of the oil in the center of the filter body 31 is zero. Therefore, when the oil filter 30 is inserted into the oil passage 113 (FIG. 3), passage resistance is large in the center where the flow velocity distribution of the oil is large. On the other hand, passage resistance on the circumferential edge is small. As a result, the flow of the oil is dispersed to the circumferential edge on the transverse section of the oil passage 113 (FIG. 3). Therefore, even when a jet stream occurs in the oil passage 113 (FIG. 3), the jet stream does not directly collide with the center of the filter body 31. A load due to the jet stream is also dispersed to the entire filter body 31. As a result, it is possible to prevent damage to the filter body 31 due to the jet stream and improve reliability and durability of the valve device 100.

Fourth Embodiment

Figure 6A:
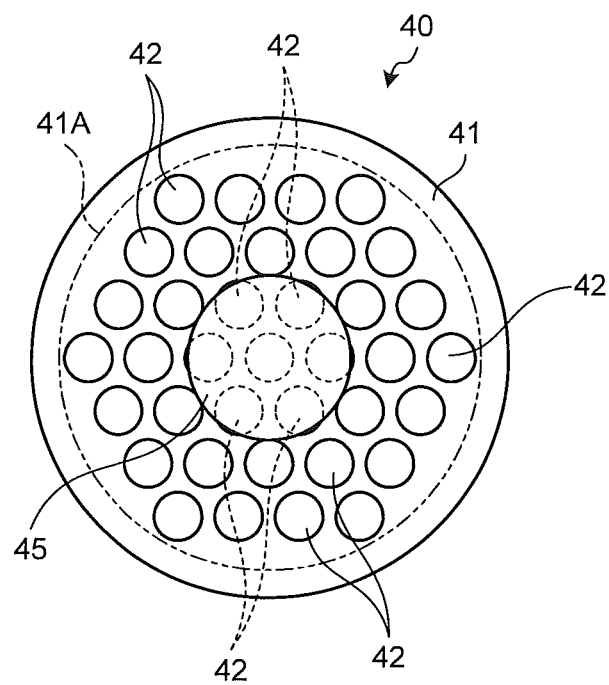
FIG. 6A is a diagram of an oil filter according to a fourth embodiment of the present invention.
Figure 6B:
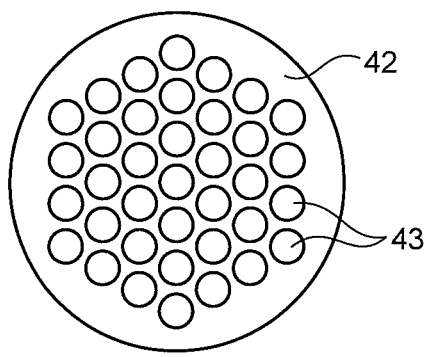
FIG. 6B is an enlarged diagram of an oil passing section provided on the outer circumferential side of the circumferential edge of a filter body in the oil filter shown in FIG. 6A and on the inner circumferential side of the circumferential edge of the filter body.

In the third embodiment explained above, the oil passing sections 32 are formed only on the circumferential edge of the filter body 31. On the other hand, in an oil filter 40 according to the fourth embodiment shown in FIGS. 6A and 6B, oil passing sections 42 are uniformly provided in an effective region 41A of a filter body 41. The number per unit area of passage holes 43 formed in the oil passing sections 42 is uniform in all the oil passing sections 42. In other words, the filter body 41 of the oil filter 40 used in the past can be applied. However, in the oil filter 40 according to the fourth embodiment, the passage ratio of oil is changed in the center and on the circumferential edge of the filter body 41 by disposing a disk-like shield plate 45 in the center of the filter body 41. As the shield plate 45, an independent plate can be fixed to the center of the filter body 41. However, it is also possible to provide the shield plate 45 in the spacer ring 115 (FIG. 3) used when the oil filter 40 is inserted into the valve body 110. In particular, when the shield plate 45 is provided in the spacer ring 115 (FIG. 3), it is unnecessary to apply, to the oil filter 40, machining other than etching, for example, machining for fixing the shield plate 45 to the filter body 41. Therefore, it is unlikely that complication of a manufacturing process is caused.

In the oil filter 40 configured as explained above, the center of the filter body 41 is covered with the shield plate 45. Therefore, the rigidity of the center covered with the shield plate 45 in the oil passage 113 (FIG. 3) is large compared with the circumferential edge. This is extremely advantageous in terms of durability.

Further, in the oil filter 40, the passage ratio of the oil in the center of the filter body 41 is zero. Therefore, when the oil filter 40 is inserted into the oil passage 113 (FIG. 3), passage resistance is large in the center where the flow velocity distribution of the oil is large. On the other hand, passage resistance on the circumferential edge is small. As a result, the flow of the oil is dispersed to the circumferential edge on the transverse section of the oil passage 113 (FIG. 3). Therefore, even when a jet stream occurs in the oil passage 113 (FIG. 3), the jet stream does not directly collide with the center of the filter body 41. The shield plate 45 that covers the center receives a load due to the jet stream. As a result, it is possible to prevent damage to the filter body 41 due to the jet stream and improve reliability and durability of the valve device 100.

REFERENCE SIGNS LIST

10 OIL FILTER
11 FILTER BODY
12*a*, 12*b*, 12*c* OIL PASSING SECTIONS
13 PASSAGE HOLES
20 OIL FILTER
21 FILTER BODY
22 OIL PASSING SECTIONS
23 PASSAGE HOLES
30 OIL FILTER
31 FILTER BODY
32 OIL PASSING SECTIONS
33 PASSAGE HOLES
40 OIL FILTER
41 FILTER BODY
42 OIL PASSING SECTIONS
43 PASSAGE HOLES
45 SHIELD PLATE
100 VALVE DEVICE
113 OIL PASSAGE
115 SPACER RING

The invention claimed is:

1. An oil filter interposed in an oil passage and configured to perform filtering of oil by causing the oil to pass through a passage hole of a filter body formed with a diameter needed to provide a desired filter function and made of metal and consisting of a single layer, wherein
   a plurality of recessed areas, each having a same size and being uniformly distributed in the filter body, are formed by performing a half etching to a half of plate thickness of the filter body on one surface of the filter body, and
   a plurality of the passage holes are formed by performing an etching in each of the recessed areas on the other surface of the filter body such that the passage holes pass through a corresponding one of the recessed areas, and
   the passage holes formed in the respective recessed areas are same in size, form, and distribution.

2. The oil filter according to claim 1, wherein the passage holes are distributed such that a passage ratio of the oil in a portion located in a center of the filter body is smaller than a passage ratio of the oil in a portion located on a circumferential edge of the filter body.

3. The oil filter according to claim 2, wherein a plurality of the recessed areas having a same size are uniformly arranged in the filter body, and the number of the passage holes per unit area in the recessed area arranged on a center side of the filter body is set smaller than the number of the passage holes per unit area in the recessed area arranged on an outer circumferential side of the filter body.

4. The oil filter according to claim 2, wherein a plurality of oil passing sections having a same number of the passage holes per unit area are arranged to be sparse in the center of the filter body compared with the circumferential edge of the filter body.

5. The oil filter according to claim 2, wherein a shield section configured to prevent the passage of the oil is formed in the center of the filter body, and the passage holes are provided around the shield section.

6. The oil filter according to claim 2, wherein a shield plate is arranged in the center of the filter body.

7. A valve device, wherein the oil filter according to claim 1 is interposed at least in an oil passage leading to a spool of a valve body.

\* \* \* \* \*